June 20, 1967

J. J. TAUB 3,327,211

MULTI-MODE MICROWAVE POWER MEASUREMENT UTILIZING
OVERSIZED MEASURING WAVEGUIDE SECTION
TO OBTAIN PLANE WAVE PROPAGATION

Filed Feb. 7, 1963

INVENTOR
Jesse J. Taub
BY
ATTORNEYS

United States Patent Office

3,327,211
Patented June 20, 1967

3,327,211
MULTI-MODE MICROWAVE POWER MEASUREMENT UTILIZING OVERSIZED MEASURING WAVEGUIDE SECTION TO OBTAIN PLANE WAVE PROPAGATION
Jesse J. Taub, Plainview, N.Y., assignor to Cutler-Hammer, Inc., Milwaukee, Wis., a corporation of Delaware
Filed Feb. 7, 1963, Ser. No. 256,864
11 Claims. (Cl. 324—95)

This invention relates to the measurement of multi-mode power propagating in a transmission line, and particularly to the measurement of such power in frequency bands above the operating frequency.

Microwave transmitter tubes frequently develop substantial amounts of power at frequencies other than the desired operating frequency. These spurious emissions may be harmonically or non-harmonically related to the fundamental operating frequency. The spurious emissions may adversely affect components of the system in which the transmitter tube is used, or the operation thereof. Perhaps more important, spurious emissions from one system may cause serious interference in other nearby systems. Accordingly, it is desirable to be able to measure the power of the spurious emissions at various frequencies.

When the output of such a transmitter tube is coupled to a transmission line such as a waveguide, the spurious emissions may propagate in a considerable number of modes depending upon their frequencies, the dimensions of the transmission line, discontinuities in the line, etc. Even though the waveguide may be selected so that modes other than the dominant mode are beyond cutoff at the fundamental operating frequency, this in general will not be true for frequencies above the operating frequency. For example, at the third harmonic of the operating frequency it may be found that the waveguide can support not only the dominant $TE_{10}$ mode but also of the order of fifteen higher modes. At the fifth harmonic of the operating frequency there may be of the order of thirty-five higher modes. Usually there will be a different cutoff frequency in the waveguide for each of the higher modes, except for TE and TM modes of the same order.

In general, different modes propagate in the waveguide at different phase velocities and have different wavelengths in the guide. Thus, at different cross-sections of the waveguide the relative phases of the various modes will be different at a particular frequency of interest. Also, the relative phases at a given cross-section for different frequencies of interest may be different. The variation of phase velocity and wavelength is particularly large near the regions of cutoff for the various modes. These factors make it difficult to measure the multi-mode power at harmonic frequencies, or other frequencies of interest.

Various techniques have been suggested for measuring multi-mode power under these circumstances. In one technique a movable probe is mounted on the wall of a standard size rectangular waveguide and moved along both wide and narrow walls so as to sample the electric field at various points along the walls. The amplitude and relative phase of the electric field sampled at each point along the walls are determined and a Fourier analysis made to determine the amount of power in each mode. In general, the computation is very elaborate, particularly if there are a considerable number of modes, and a digital computer is required. Further, the measurements are made at a number of cross-sections of the waveguide, depending upon the number of modes of interest. This technique is described in an article entitled, "Effects and Measurement of Harmonics in High Power Waveguide Systems," by Forrer and Tomiyasu, IRE Convention Record, 1957, Part I, pp. 263–269.

Another technique is similar to the above-described technique except that a number of small fixed calibrated electric probes are mounted in the broad and narrow walls of the waveguide, rather than employing movable probes. Such a technique is described by Price in an article entitled, "Measurement of Harmonic Power Generation by Microwave Transmitters," IRE Transactions on Microwave Theory and Techniques, vol. MTT–7, January 1959, pp. 116–120.

A third technique employs a number of sampling irises or probes spaced around the periphery of the standard waveguide. The squares of the sampled field amplitudes are averaged to give the total multi-mode power. The accuracy obtainable with this technique is not good, even when both transverse electric and transverse magnetic fields are sampled, and is considerably poorer when only electric or magnetic fields are sampled. Further, the accuracy is dependent on the ratio of the cutoff frequencies of the various modes to the frequency of interest. Such a technique is described by Sharp & Jones in an article entitled, "A Sampling Measurement of Multi-Mode Waveguide Power," IRE Transactions on Microwave Theory and Techniques, vol. MTT–10, January 1962, pp. 73–82.

Still another technique is to use a number of mode couplers mounted on the waveguide walls, each coupler being designed to respond only to a particular mode. The power in each mode is then determined and summed to get total power. This technique becomes very complex and expensive as the number of modes involved increases.

In general, the above-described techniques are either complex and time-consuming, or are inaccurate, or both.

The present invention provides a measuring technique which is relatively simple and capable of a satisfactorily high degree of accuracy for many applications. Elaborate computers are not required and total multi-mode power at a given frequency may be determined very quickly. Also, the determination of multi-mode power at different frequencies of interest can readily be accomplished. Further, measurements over a wide range of power levels can be made, say from —50 to +50 dbm or more.

In accordance with the invention, a measuring transmission line section is employed having cross-sectional dimensions substantially larger than the cross-sectional dimensions of the transmission line which normally would be employed in conventional practice, and the large measuring section is coupled to the normal or standard size transmission line leading from the source of power through a tapered section which provides a smooth transition and avoids reflections and mode generation of its own. In the large measuring section, mode cutoff frequencies are substantially lower than the cutoff frequencies of like modes in the smaller standard size transmission line, and substantially plane wave propagation approaching free space conditions exist for all modes which can be coupled thereto from the smaller line. Measurements of the field intensities are made at a plurality of points transverse to the direction of propagation in the large measuring section, and simple computations involving squaring and averaging of the sampled field intensities suffice to give a measurement of multi-mode power to a high degree of accuracy.

The measurements may be made by the use of either sliding or fixed probes. With sliding probes, the field may be sampled at a number of points in a given cross-section of the large measuring section, distributed both horizontally and vertically. This procedure samples the field at various points throughout the cross-section, and by averaging the squared values of the sampled fields the multi-mode power is obtained. In the fixed probe technique, a number of probes are spaced along the walls of the measuring section transverse to the direction of propagation therein, so as to sample the field near the walls. These samples are squared and averaged to give a multi-mode power measurement. A single measurement of this character may not give the power to as high a degree of accuracy as desired. Accordingly, to improve the accuracy a line stretcher is inserted between the measuring section and the transmission line in which the power flow is to be determined, and measurements repeated for various adjustments of the line stretcher. By averaging the plurality of power measurements thus obtained, a resultant power measurement can be obtained with a high degree of accuracy. A commutator may be employed to connect the probes to a receiver in rapid sequence, and electronic averaging employed to give a power measurement in a very short time.

For applications where it is desired to determine the spurious emissions of a transmitting source, the measuring section is commonly terminated in a multi-mode matched load. However, it is also possible to determine the power under mismatched conditions.

The invention will be described in connection with specific embodiments utilizing rectangular waveguide. However, it is applicable to waveguide of circular or other cross-sectional configuration, and also to transmission lines of other types such as coaxial line.

Further features and advantages of the invention will appear as the description proceeds. The invention will be best understood from the following description of specific embodiments thereof, taken in conjunction with the accompanying drawings in which:

Figures 1, 2, 3:
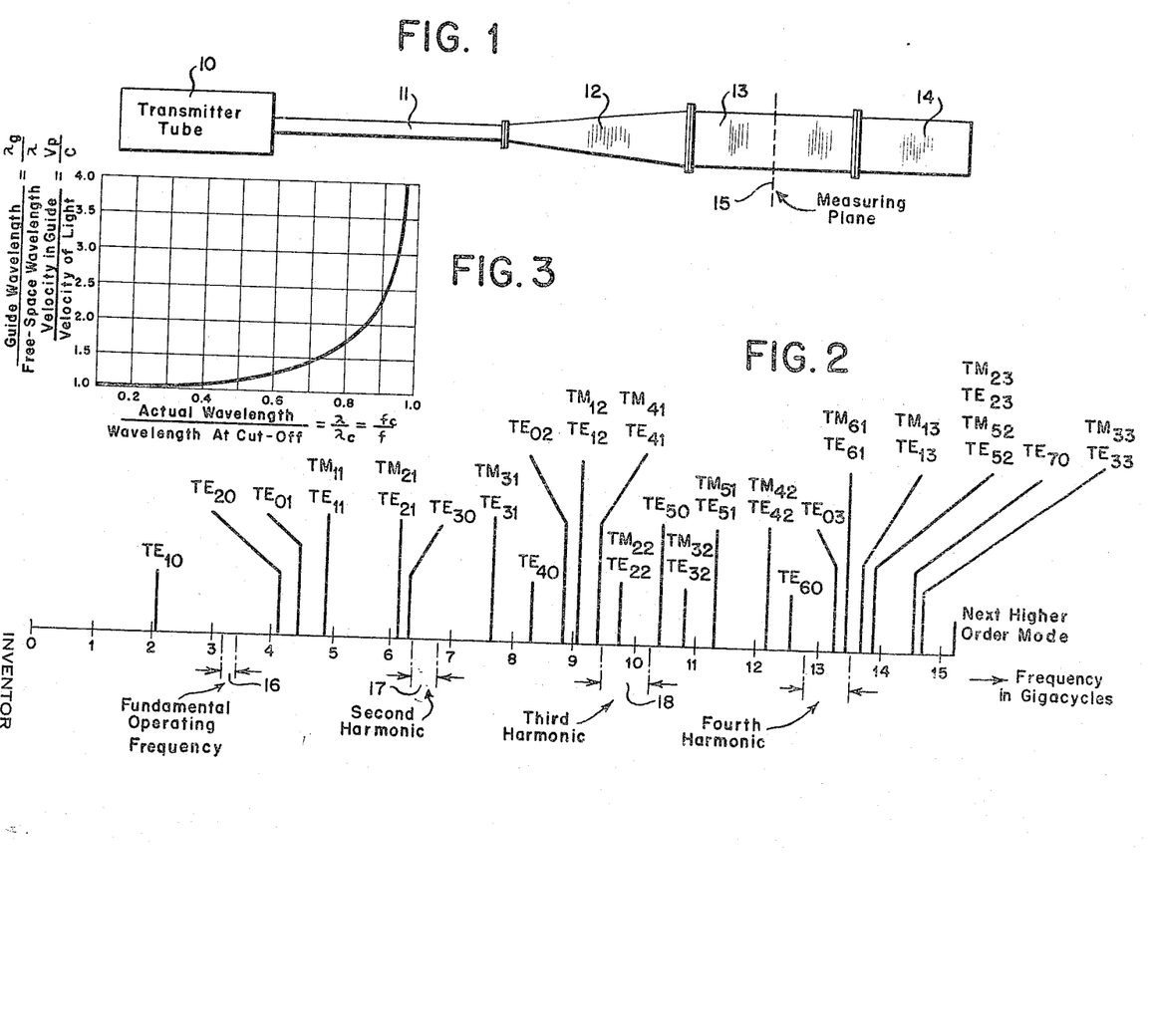
FIG. 1 is an overall view illustrating use of the invention for measuring spurious transmissions from a transmitter tube.
FIG. 2 illustrates the cutoff frequencies for various modes which can propagate in a standard S-band waveguide.
FIG. 3 illustrates the variation of phase velocity and wavelength in a waveguide as a function of the ratio of actual wavelength to the cutoff wavelength, or cutoff frequency to actual frequency.

Referring to FIG. 1, transmitter tube 10, such as a high power microwave radar transmitter tube, is coupled to a transmission line 11. Normally, transmission line 11 would be connected to other portions of a system, such as to an antenna, etc. However, for measuring purposes the remainder of the system may be disconnected, and the transmission line 11 coupled through a tapered transmission line section 12 to a measuring section 13. As will be explained hereinafter, the cross-sectional dimensions of the measuring section 13 are larger than those of 11, so that the cutoff frequencies in 13 for the various modes are substantially lower than those in 11. A multi-mode load 14 is coupled to the measuring section 13 so as to provide a substantially matched load for all frequencies and modes of interest, thereby avoiding reflections. A measuring plane 15 is shown extending across the measuring section 13 and transverse to the direction of propagation therein. It will be assumed that transmitter tube 10 has spurious emissions at frequencies above its fundamental operating frequency.

Referring to FIG. 2, the cutoff frequencies of a large number of modes are shown for a standard S-band rectangular waveguide having internal dimensions of 2.84 inches by 1.34 inches. Frequency is given in gigacycles ($10^9$ cycles per second). The cutoff frequency for the dominant $TE_{10}$ mode is slightly above 2 gigacycles, that for the first higher mode is twice that for the dominant mode, and other higher modes have still higher cutoff frequencies.

Normally the fundamental operating frequency and the waveguide dimensions will be selected so that only the dominant mode can propagate at the operating frequency. For example, a ratio of about 1.5 between operating frequency and cutoff frequency for the dominant mode is common practice. Such a region is shown at 16. The second harmonic of the operating frequency will then lie in region 17, and it will be observed that for this particular waveguide there are seven higher modes whose cutoff frequencies lie below the second harmonic. Accordingly, it is possible for the second harmonic frequency to propagate in a number of higher modes as well as in the dominant mode, depending on the manner in which the transmitter tube is coupled to the waveguide, discontinuities, etc. For a frequency in the region of the third harmonic shown at 18, propagation in fifteen higher modes is possible. A total of thirty-five higher modes are shown in FIG. 2, and it will be apparent that at the fifth harmonic of the operating frequency propagation in this number of modes is possible. Thus, if the total power at any given frequency is to be measured, the measurement must take into account all the various modes in which that particular frequency can be propagated.

FIG. 3 shows the manner in which the wavelength and phase velocity vary in a rectangular waveguide as a function of the ratio of guide wavelength to the cutoff wavelength, equivalent to the ratio of the cutoff frequency to the actual frequency. The plotted curve corresponds to the equation:

$$\text{Guide wavelength} = \lambda_g = \frac{\lambda}{\sqrt{1-(\lambda/\lambda_o)^2}} \quad (1)$$

Since phase velocity in the guide is equal to the frequency multiplied by the guide wavelength, the same curve gives the ratio of phase velocity to the velocity of light.

As will be noted, at frequencies near the cutoff frequency the guide wavelength is markedly longer than the free space wavelength, and the phase velocity is markedly greater than the velocity of light. As the frequency increases, the ratios become smaller, eventually reaching substantially free-space conditions. Thus, for a frequency twice the cutoff frequency, the ratio is 1.15, and for three times the ratio is 1.06.

From FIG. 2 it will be apparent that in a waveguide of standard dimensions the cutoff frequency of one or more modes may lie quite close to the frequencies of interest, whereas the cutoff frequencies of other modes may be considerably lower. From FIG. 3, it will be seen that under these circumstances the guide wavelengths for the various modes at a given frequency may be quite different, and the phase velocities may be quite different. In general the relative phases will vary with the frequency, and also will be different at different points along the waveguide. The propagation will be non-planar, that is, there will be substantial E and H components along the direction of propagation. Accordingly, it is difficult to measure the total multi-mode power in a waveguide of normal dimensions, and elaborate measurements and computations are required for reasonably accurate results.

By employing a measuring transmission line section 13 whose cutoff frequencies are substantially below those in the transmission line section 11, and coupling the sections by a tapered section which avoids reflections and mode generation, substantially plane wave propagation under nearly free-space conditions can be obtained in the measuring section for all modes that can be coupled thereto from the smaller transmission line section. Thus the waveguide impedance, propagation constant, wavelength and phase velocity will be nearly the same for all modes in the measuring section. This markedly reduces the difficulties of measuring and computing the multi-mode power.

For example, assume that section 13 is a waveguide section whose linear cross-sectional dimensions are three times those of 11. The cutoff frequencies for like modes will be reduced to one-third the corresponding cutoff frequencies in 11. Accordingly, a frequency of interest which is near a modal cutoff frequency in 11 will be three times the cutoff frequency in section 13. From FIG. 3, at three times the cutoff frequency the ratio of guide to free-space wavelength, and phase velocity to velocity of light, is only 1.06. For modes in section 11 having lower cutoff frequencies, the ratio will be still closer to unity. Thus in section 13 there will be only slight differences in wavelength and velocity of propagation for all the modes which can be fed thereto from transmission line 11. Hence the relative phases of the various modes at a given frequency will change only slightly along the measuring section, and only slightly with the frequencies of the spurious emissions.

It has been found that by sampling the field strengths at a plurality of points transverse to the direction of propagation in the oversize measuring waveguide section, the multi-mode power can be determined with a high degree of accuracy by simple averaging computations. Both sliding and fixed probe measurements can be used, as described hereinafter, each having certain relative advantages.

Figure 4:
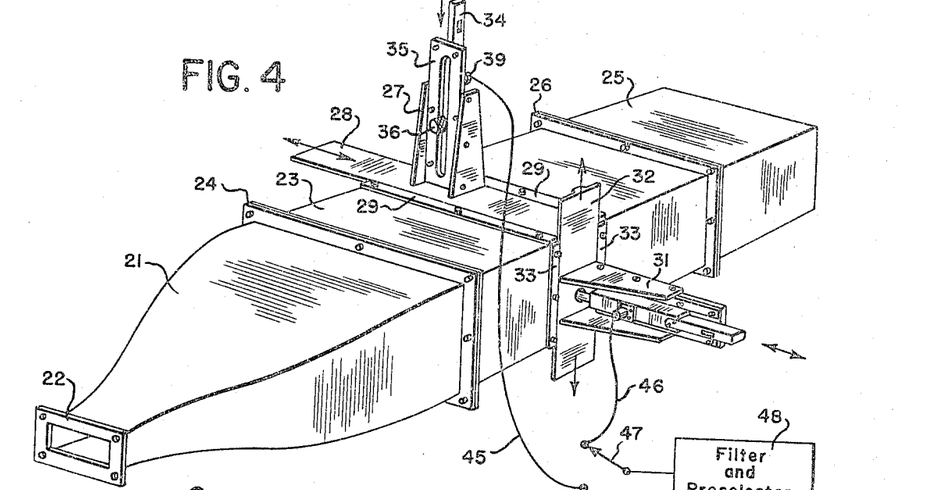
FIG. 4 is a perspective view of measuring apparatus using a movable probe, with the receiver circuits shown in block diagram form.

Referring to FIG. 4, a tapered waveguide section 21 is provided with a flange 22 at the small end thereof for connection with a standard siz waveguide transmission line in which the multi-mode power to be measured is propagating. The large end of tapered section 21 is connected to an oversize waveguide measuring section 23 by flanges 24. Tapered section 21 is here shown as having a non-linear double-flared taper. It is desirable for the tapered section to provide coupling between the small and the enlarged waveguide sections without reflection or introducing additional modes of its own. While this is possible with a linear taper as shown at 12 in FIG. 1, a very long section may be required. By using a non-linear double-flare, the length may be reduced. In the taper shown at 21, the maximum rate of change in the cross-section appears near the small end of the taper, so that any modes produced thereby will have cutoff frequencies near that of the small waveguide to which it is connected, and hence will not seriously impair the accuracy of measurement. The design of suitable tapers is known in the art and need not be described further.

The dimensions of the oversige measuring section may be selected in view of the desired measuring accuracy. A three times enlargement has been used with success. For example, in one specific embodiment for use with a standard S-band wave-guide having internal dimensions 2.84 by 1.34 inches, the internal dimensions of the measuring section are 8.5 by 5.8 inches. The ratio for the broad wall is three times whereas that for the narrow wall is over four. The latter was to make the impedance of the measuring section match that of the small section. However, various form factors may be used for the measuring section with a properly tapered coupling section to launch a plane wave therein.

A multi-mode matched load 25 is connected to the other end of measuring section 23 by flanges 26 so as to avoid reflections. A carriage 27 is mounted on plate 28 which is slidable along the broad wall of the measuring waveguide section 23 between guideways 29. Another probe carriage 31 is mounted on plate 32 which is slidable between guideways 33 for movement in the vertical direction along the narrow waveguide wall. The probe carriages are similar and only the horizontally moving carriage will be described in detail.

Figures 5, 6:
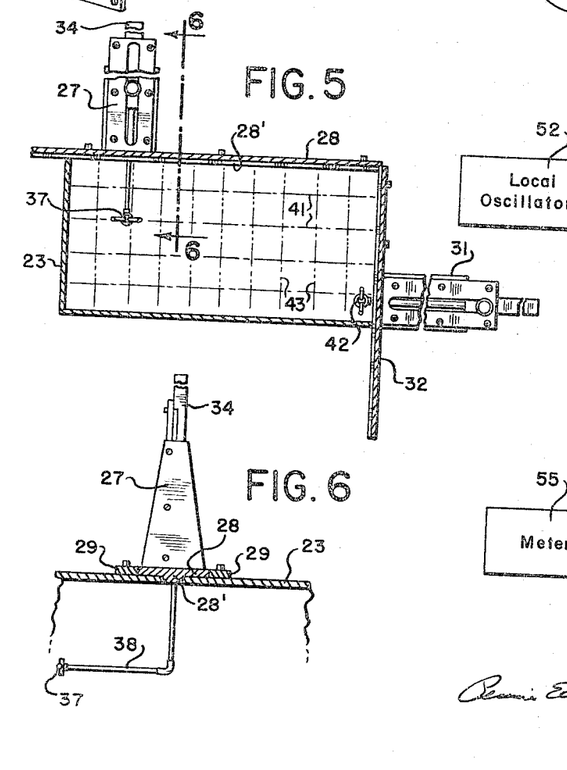
FIG. 5 is a cross-section of the large measuring waveguide showing the scanning pattern of the movable probes.
FIG. 6 is a partial cross-section longitudinal of the waveguide showing the movable probe assembly.

A probe holder 34 is slidably mounted on the vertical face plate 35 of carriage 27 for movement in the vertical direction. A thumb screw 36 is provided to tighten the probe holder against the face plate at various vertical positions. As seen in FIGS. 5 and 6, the probe holder 34 carries at the lower end thereof a probe 37 which projects into the measuring waveguide section 23. As here shown, probe 37 is a small balanced dipole. The two elements of the dipole are connected to respective conductors insulatedly mounted within a tubular shield 38. Shield 38 is small in diameter so as to minimize distortion of the fields within the waveguide, the L-shaped arrangement shown being found helpful in this respect. The leads from the dipole are brought out to a coaxial connector 39 (FIG. 4), and a conventional balun (not shown) may be employed to convert the balanced line to an unbalanced line for connection to the succeeding circuits.

Plate 28 has a tongue 28' which moves in a transverse slot in the waveguide wall. It is desirable to avoid discontinuities in the waveguide wall as much as possible, and to this end the tongue 28' and the corresponding slot are tapered and machined to form a close sliding fit.

In operation, the horizontal sliding carriage 27 is moved along a raster-like scanning pattern such as shown by dot-dash lines 41. Thus, the probe 37 is adjusted to move along one level 41 and measurements taken continuously or at regular intervals therealong. Then the depth of insertion of the probe is increased and the probe is moved along another level with readings taken therealong. Similarly, the probe 42 mounted on the vertically scanning carriage 31 is moved along a vertical raster such as shown by dot-dash lines 43. In this manner the variation in the electric field both horizontally and vertically throughout the cross-section of the waveguide can be determined.

The number of scanning levels may be selected in view of the number of higher modes expected to significantly enter into the total multi-mode power. In general the number of levels should equal or exceed the highest mode index number to be included in the measurement. Ten equally spaced levels have been employed with success. Measurements along a given level may be made continuously or at discrete intervals depending on the type of averaging it is desired to employ.

Before proceeding further with the description of the measuring apparatus, a brief discussion of the basis for the measurement will be given.

As discussed above in connection with FIGS. 1–3, in a waveguide of standard dimensions for the operating frequency employed there are substantial E and H components along the direction of propagation, frequently called the z axis. However, by employing a substantially larger cross-section for the measuring waveguide section, substantially plane wave propagation exists, approaching that of free space, and variations along the z axis may be neglected. Under such conditions it has been found that the power P flowing across a given cross-section can be expressed as:

$$P = \frac{1}{\eta} \int_0^b \int_0^a (|E_x|^2 + |E_y|^2) \, dx \, dy \qquad (2)$$

where $\eta$ = the intrinsic impedance $120\pi$ of free space;

$a, b$ = horizontal and vertical measuring waveguide dimensions;

$E_x, E_y$ = components of the transverse electric field in horizontal and vertical directions;

$x, y$ = horizontal and vertical directions.

Figures 7, 7A, 8:
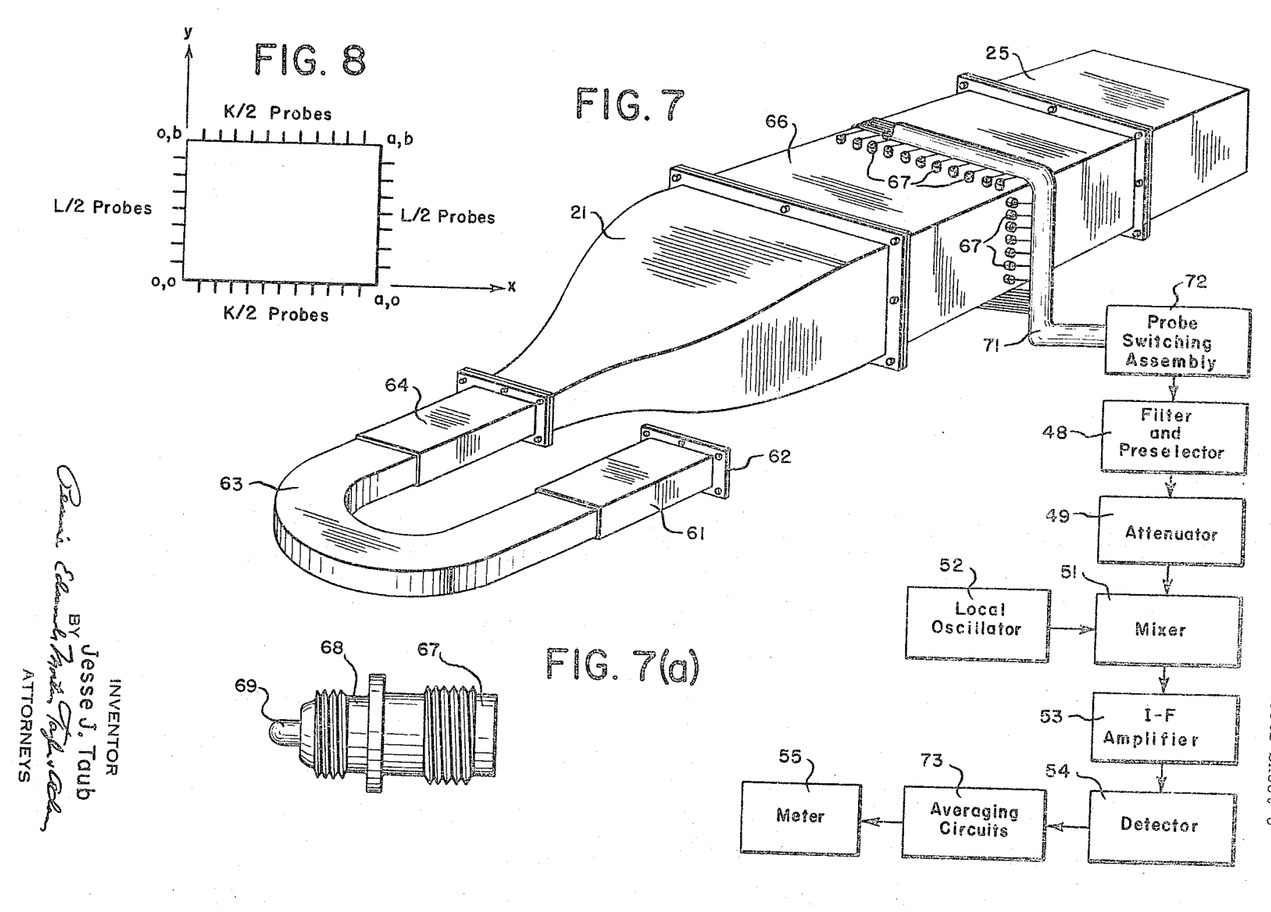
FIG. 7 is a perspective view of measuring apparatus employing fixed probes and a line stretcher, with receiver circuits shown in block diagram form.
FIG. 7(a) is a detail of a suitable fixed probe.
FIG. 8 is a diagram illustrating the location of the probes along the broad and narrow waveguide walls.

The quantities $a$, $b$, $x$ and $y$ are further shown in FIG. 8.

Equation 2 is an accurate expression for power flow in an arbitrarily large rectangular waveguide wherein propagation is essentially that of free space. In practice, some limit will be imposed on the dimensions of the waveguide. The error due to the employment of a finite waveguide measuring section will depend on the dimensions. For example, the maximum error for a measuring section having dimensions three times that of the waveguide in which the power normally propagates can be calculated to be of the order of 6%, which is about 0.25 db. This error is estimated by taking the worst case of a mode that is just slightly above cutoff in the smaller waveguide, and comparing the exact power flow calculated by conventional methods with that predicted by Equation 2. This error will commonly be an upper bound because most of the other modes will be farther from cutoff. For a measuring waveguide section twice that of the smaller section, a maximum error of the order of 15% or 0.6 db would apply. In some applications it may be known that the modes propagating in the smaller waveguide are such that none of them are near cutoff in that waveguide, or lesser accuracy may suffice. In such case sufficient accuracy may be obtainable with oversize measuring sections whose dimensions are smaller, say 1.5 to 2 times the dimensions of the smaller guide.

Equation 2 is a double integral and, in theory, would require an infinite number of measurements in $x$ and $y$ directions. However, for most practical purposes, measurements at a limited number of discrete levels and at a limited number of points along each level will suffice, as discussed above.

Returning to FIG. 4, a superheterodyne receiver is employed to measure the power sampled by the moving probes. With a sensitive receiver, very low multi-mode power levels can be measured. The outputs of the vertical and horizontal probes are supplied through transmission lines 45 and 46 to a switch 47. Commonly, coaxial lines will be employed, but they are here shown as single lines for simplicity. The switch enables the output of either probe to be connected to a filter and preselector 48 which selects the desired frequency of interest. The power at the fundamental operating frequency may be expected to be large compared to the spurious power. Hence filter 48 should be designed to strongly attenuate the fundamental frequency. If only one higher frequency is of interest, a fixed preselector designed to pass a narrow band at the desired frequency may be employed. Or, a preselector tunable over the frequency range of interest may be employed.

The output of the filter and preselector is supplied through an attenuator 49 to a mixer 51. For low power measurements a highly sensitive receiver is required in order to secure output signals of adequate amplitude. However, at high power levels the signals from the probes may be excessive. Attenuator 49 may be adjustable to accommodate a large range of power levels. Mixer 51 is supplied with a local oscillator frequency from 52. The resultant intermediate frequency is amplified in 53 and detected in 54. A meter 55 indicates the amplitude of the detected signal.

From Equation 2 it will be noted that the squares of the electric field intensities are to be averaged. The circuits shown in FIG. 4 may be designed to give an output indication on meter 55 which is proportional to the magnitude of the electric field in the waveguide. The probes and receiver may be calibrated to determine the constant of proportionality. The meter indications may then be squared and an average taken in known manner. Or, detector 54 can be designed as a square law detector, or a squaring circuit inserted between the detector and meter 55, so that the meter reads directly the squared values of the electric field components in the waveguide. For continuous measurements along the various levels, the meter may be replaced by suitable means for determining the average of the squared values.

The apparatus of FIG. 4 is capable of considerable accuracy, and measurements with an accuracy of a fraction of a db have been obtained in specific instances. It will be noted that only a simple computation of the average of the squared values of the electric field is required, thereby eliminating the need for a digital computer. However, the sliding probes must be carefully made, and considerable time may be required to complete the measurements and computations.

FIG. 7 shows an apparatus using fixed probes which facilitates construction, reduces measurement time, and is capable of operation at very high power levels.

Referring to FIG. 7, an input waveguide section 61 is provided with a flange 62 for connection with the standard size waveguide in which the multi-mode power is propagating. A line stretcher 63 is provided, and here takes the form of a so-called "trombone" to facilitate adjustment without requiring movement of associated apparatus. Section 63 is slidable within section 61 and an output section 64. Spring fingers may be used in the sliding sections to provide good coupling for all modes and frequencies of interest. Section 64 is connected through a tapered waveguide section 21 to an enlarged waveguide measuring section 66.

Measuring section 66 is provided with a plurality of probes 67 spaced along each of the four walls of the waveguide. The number of probes depends on the number of the higher modes to be included in the measurement. In one specific embodiment eleven probes were used along each of the broad walls of the waveguide, and seven along each of the narrow walls, in order to measure modes having indices up to $m=11$ and $n=7$.

The probes may take the form shown in FIG. 7(a), which is a conventional coaxial connector having an outer wall 68 and an inner conductor 69 rounded at its end. The probe is threaded for insertion into the waveguide wall and for connection of a coaxial cable thereto. To avoid materially affecting the fields normally existing within the waveguide, the probes are advantageously designed so as to provide an output sample which is small compared to the power flowing in the waveguide. A reduction of the order of 40 db has been employed with success.

The outputs of probes 67 are supplied to respective coaxial lines, here shown as forming a cable 71. The lines are connected to a probe switching assembly 72 which allows the output of each probe to be supplied to the receiver. The receiver is here shown as of the superheterodyne type, containing components similar to those shown in FIG. 4 and bearing the same numbers. The probe switching assembly can be arranged for manual operation and an output meter indication obtained in the same manner as described in connection with FIG. 4, with subsequent calculation of the average of the squared values of the electric field. However, it is here assumed that the probe switching assembly can be switched fast enough so that electronic averaging can be employed. To this end, the output of detector 54 is supplied to averaging circuits 73. Circuit 73 may be designed in conventional manner to average the outputs of detector 54 if the latter represent the square values of the electric field. If receiver and detector are linear, circuit 73 may include a squaring circuit before the average is obtained.

In the embodiment of FIG. 7 the electric field intensity is sampled only along the walls of the waveguide. This differs somewhat from the arrangement of FIG. 4 in that there the electric field is sampled throughout the cross-sectional area. When only the fields along the walls are sampled, an error exists which may be reduced by proper employment of the line stretcher 63.

The power measured by the apparatus of FIG. 7 may be expressed as:

$$P_a = \frac{ab}{2\eta}\left[\frac{1}{K}\sum_{k=1}^{K}|E_{Y_k}|^2 + \frac{1}{L}\sum_{l=1}^{L}|E_{X_l}|^2\right] \quad (3)$$

Here K is the number of broad wall probes and L is the number of narrow wall probes. The relationships are further shown in FIG. 8. There will be a constant of proportionality depending on the details of probe and receiver design which can be determined in a particular application.

Equation 3 is related to Equation 2 as follows:

$$P_a = P + \text{error terms} \quad (4)$$

The error terms arise out of cross products of different modal field amplitudes and phases. Analytical expressions can be obtained for the error terms, and it is found that they are real quantities that can be either positive or negative, with equal probability, depending on the time phases of the modal amplitudes. A detailed mathematical development is given in a paper by Taub entitled, "A New Technique for Multimode Power Measurement," Transactions of the IRE Professional Group on Microwave Theory and Techniques, November, 1962.

By changing the length of the line in the smaller waveguide section with line stretcher 63, the modal time phasing occurring at the probes 67 can be redistributed. Thus, power readings can be taken under several different modal phase conditions. The exact nature of the error terms in a given application will depend upon the modes present and their relative amplitudes and phases, and in general these factors will be different at different measuring frequencies. By adjusting the line stretcher to different positions until readings approximately repeat, and averaging the readings, the error terms can be substantially eliminated and a satisfactorily accurate power measurement obtained. It has also been found that by moving the line stretcher sufficiently to yield maximum and minimum power readings, and taking the average of the maximum and minimum readings, accuracies can be obtained which are also satisfactory for most purposes. For example, in one measurement an accuracy of a fraction of a db was obtained. The amount of line stretching employed will depend on the modal content and the desired accuracy, but in general a variation of the order of six free-space wavelengths has been found sufficient.

If desired the line stretcher may be motor driven to facilitate measurement in a short time.

Instead of mounting the fixed probes on all four walls of the measuring section, it is also possible to arrange them on only one wide and one narrow wall, and such an arrangement may suffice for some applications. However, it has been found that the error terms are markedly reduced and become less significant when measurements are made on all four walls. The four wall arangement is specifically claimed in an application S.N. 257,003 of Taub and Goldberg entitled, "Improvement in Multi-Mode Power Measurement," filed concurrently herewith.

In some specific applications the modal content may be such that the $E_x$ components are much less important than the $E_y$ components. In such case measurement of the variation in the $E_y$ field across the broad dimension of the waveguide may suffice.

Figure 9:
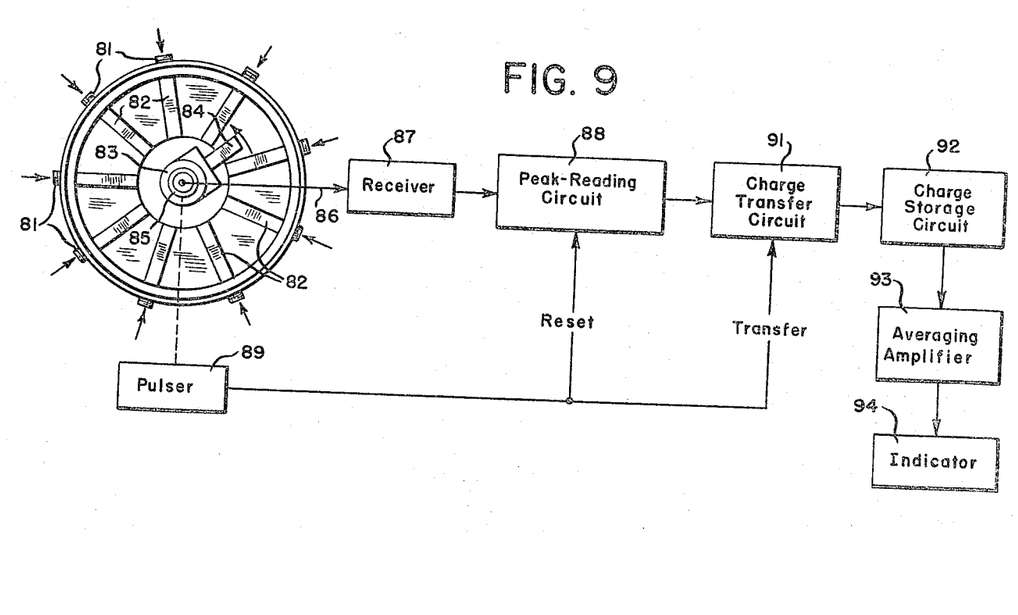
FIG. 9 shows a commutator and associated circuits which may be used with the fixed probe arrangement of FIG. 7.

Referring now to FIG. 9, a commutator is shown for connecting the probes 67 of FIG. 7 to the receiver circuits in rapid sequence. Suitable commutator structures are known in the art and that shown is considerably simplified for ease of illustration and explanation. A number of input connections 81 are provided for the coaxial lines from the probes, and may be made equal in number to the number of probes used. Here only a few are shown for simplicity. The inner conductors of the connectors 81 are coupled to radially extending stator segments 82. A rotor 83 is provided with a rotating blade 84 and an output coaxial connection 85. When the rotating blade is over a given stator segment 82 the transfer function of the commutator is at a maximum and a maximum signal is coupled to the output line 86. In between, the transfer function is less. Thus, as the rotor 83 rotates, output signals will be obtained successively corresponding to the signals picked up by the probes, each signal varying between a maximum and some lower value.

The commutator output is supplied to a receiver 87 of the type described hereinbefore, to obtain outputs which are the squared values of the inputs from the commutator. The squared video output of the receiver is fed to a peak reading circuit 88 which determines and temporarily stores the peak value of each squared signal supplied thereto. A pulser 89 is coupled to the rotor 83 and phased to give a pulse in between the positions where the transfer function is at a maximum. A charge transfer circuit 91 is arranged to transfer the peak output of circuit 88 to a charge storage circuit 92, upon occurrence of a pulse from pulser 89. The pulse also serves to reset the peak reading circuit 88.

Commonly the peak-reading circuit will contain a capacitor which charges to the highest output voltage from the receiver that occurs during a commutator segment sampling interval. Upon occurrence of a pulse from pulser 89, this voltage will be transferred to charge storage circuit 92, which commonly will contain a capacitor which successively assumes the successive peak voltages of the peak-reading circuit. With uniform rotation of the commutator, each stored peak voltage will have the same time duration.

The output of the charge storage circuit 92 is supplied to an averaging amplifier 93, which may be an amplifier with a load impedance having a long time constant, so as to yield an output proportional to the average of the peak powers coupled by the probes as the commutator rotates. This average is given by indicator 94.

Frequently power measurements will be made on a pulse-type radar transmitter. By rotating the commutator at a speed such that a number of transmitted pulses occur as the rotor blade passes from one stator segment to the next, one or more video pulses from the receiver will occur substantially at the maximum of the transfer function of the commutator. Thus proper peak-reading and subsequent averaging will be obtained.

The circuits of FIG. 9 may be of types well known in the art, and further description thereof is unnecessary. By using the commutator arrangement of FIG. 9 in the apparatus of FIG. 7, the average power for each position of the line stretcher can be determined in a matter of seconds, so that the complete power measurement can be made very quickly.

Figure 10:
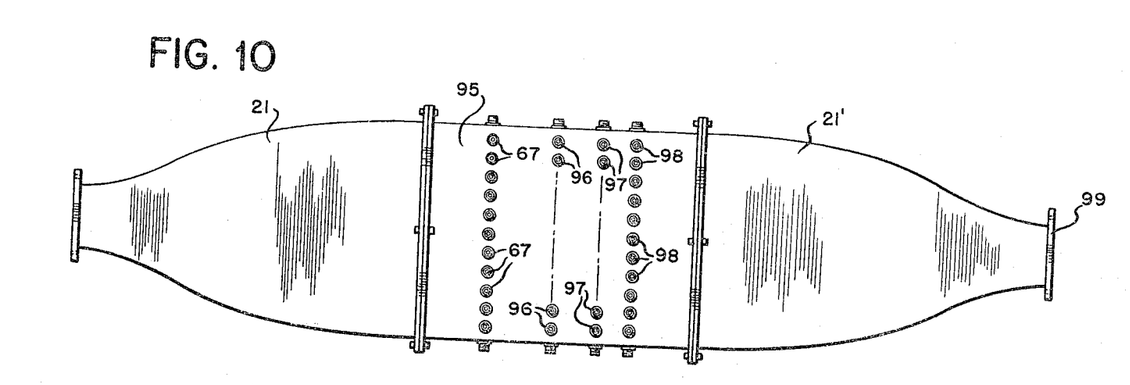
FIG. 10 shows an enlarged waveguide section with probes arranged at several cross-sections and tapered waveguide sections at each end.

FIG. 10 shows an oversize measuring section 95 with tapered waveguide sections 21 and 21' joined to each end thereof. This permits the measuring section to be permanently inserted in a system for monitoring purposes, or to make measurements under load conditions actually existing in the system. Probes are arranged around the walls of the measuring section 95 at several cross-sections thereof. Probes 67 may be arranged as already described in connection with FIG. 7. The additional rows of probes are denoted 96, 97 and 98. The several rows of probes may have different specific uses depending upon the application.

In some instances it may be desired to make rapid measurements by the commutator apparatus shown in FIG. 9 over a wider frequency range than the bandwidth of a given commutator can accommodate. In such case, the probes at different cross-sections may be connected to commutators designed for respective portions of the overall frequency range to be covered. The commutators can then be successively connected to the receiver circuits. For such a measurement a multi-mode matching load may be connected to the output end 99 of tapered section 21', or the tapered section may be removed and a multi-mode matching load connected to the measuring section as described above.

The several rows of probes can also be utilized to make power measurements under mismatched conditions. For example, it may be desired to measure the spurious power fed to an antenna which commonly will be a mismatched load impedance outside its intended range of operation.

Under mismatched conditions, some power will be reflected from the load. The phase of the reflected power with respect to the incident power will vary along the measuring section 95. With probes at a single cross-section, it can be shown that the power coupled by the probes is equal to a constant plus a sinusoidally varying function of the phase length. By varying the phase of the reflected wave at the plane of the measuring probes, as at the plane of probes 67, and taking the arithmetic average of the indicated power for a half wavelength phase variation, an equivalent power $P_e$ can be obtained from which the power $P_T$ absorbed by the mismatched load can be determined. For each phase of the reflected power, a line stretcher ahead of taper 21 may be varied as described in connection with FIG. 7, so as to get an accurate measurement of the multi-mode power for that reflected phase relationship.

The variation in phase of the reflected wave at the plane of probes 67 can be obtained by inserting a line stretcher between the tapered section 21' and the load, or in the large measuring section 95 between the probes and the load. In such case an average of the maximum and minimum powers can be used. However, by measuring the multi-mode power at several different cross-sections having a total spread of the order of a wavelength (but preferably not exactly a wavelength), and averaging the powers measured at the several cross-sections, a close approximation can be obtained. Measurements at three or four cross-sections will give a close enough approximation for many purposes, and measurements at additional cross-sections could be made to obtain still greater accuracy.

If the equivalent power $P_e$ is obtained in this manner, a fairly exact measurement of the power absorbed by the mismatched load can be obtained by substituting a multi-mode matched load for the mismatched load and repeating the measurements at one of the cross-sections. The relationship is as follows:

$$P_e = P_M + P_R \qquad (5)$$

where $P_e$ = power measured under mismatched conditions;
$P_M$ = power absorbed by a matched load;
$P_R$ = power reflected from the mismatched load.

The power $P_T$ absorbed by a mismatched load is given by:

$$P_T = P_M - P_R \qquad (6)$$

Eliminating $P_R$ from Equations (5) and (6) gives:

$$P_T = 2P_M - P_e \qquad (7)$$

Thus the power absorbed by the mismatched load can be readily determined from the above-described measurements.

The spacing between the cross-sections at which the probes are located can be selected arbitrarily, but in general spacings of a half-wavelength or multiple thereof should be avoided so as not to duplicate measurements.

It is possible to measure the approxiate power absorbed by the mismatched load without the use of a matched load. This can be done by computing the geometric mean of the maximum and minimum power measured at the several cross-sections under mismatched conditions. Or, a greater degree of accuracy can be obtained by making the measurements at a single cross-section and using a line stretcher between the measuring cross-section and the load so as to obtain true maximum and minimum readings. This procedure may not be as accurate as that using a matched load measurement, but may be acceptable for many applications.

In the above embodiments the measurement of multi-mode power in waveguides of rectangular cross-section has been specifically described. Waveguide of rectangular cross-section is commonly employed for microwave transmission, but occasionally waveguide of circular or other cross-section is employed. These types of waveguide also have cutoff frequencies for different modes. The invention may be applied to such waveguides, by employing a measurement section of larger dimensions and sampling the fields in the measuring section.

Coaxial transmission lines are also employed to transmit power at microwave frequencies. Although a coaxial line has no cutoff frequency for the dominant TEM mode, the higher modes do have cutoff frequencies and accordingly the measurement of multi-mode power at frequencies above the fundamental operating frequency becomes difficult. In such case a measuring coaxial line section of larger dimensions may be employed to reduce the cutoff frequencies for modes which can propagate in the smaller coaxial line, and the fields sampled and averaged in the same general manner as that described above.

In the foregoing description of specific embodiments, the probes sample the electric field in the measuring section. The electric field is related to the magnetic field through Poynting's vector, and similar results could be obtained by using probes which sample the H field rather than the E field. Probes for sampling the H field are likely to be narrow band and hence less suitable for measurements over a wide range of frequencies, and may be subject to other disadvantages. Accordingly it is preferred to employ probes which sample the E field.

The invention has been described in connection with specific embodiments thereof. It will be understood that many modifications may be made by those skilled in the art within the spirit and scope of the invention.

I claim:

1. In the measurement of multi-mode electro-magnetic wave power propagating in a waveguide by measuring the field strengths at a plurality of points aligned transversely to the direction of propagation and utilizing the measurements to provide an indication of the power, apparatus which comprises a first waveguide section, a source of electromagnetic waves coupled to said first waveguide section and supplying thereto electromagnetic waves at a fundamental frequency and also supplying waves at frequencies higher than said fundamental frequency that propagate in said first waveguide section in a plurality of modes higher than their dominant modes, a measuring waveguide section possessing propagating characteristics for said waves in said higher modes that yield cutoff frequencies therein which are sufficiently below the cutoff frequencies of like modes in said first waveguide section to obtain substantially plane wave propagation of said waves in said measuring waveguide section, coupling means for coupling said measuring waveguide section with said first waveguide section to supply said waves in said plurality of modes to the measuring waveguide section, and sampling means for sampling the field strengths of the waves in said higher modes at a plurality of points aligned tranversely to the direction of wave propagation in said measuring waveguide section, the sampled field strengths being useful for providing indications of the power of electromagnetic waves propagating in said higher modes.

2. The apparatus claimed in claim 1 wherein, said first and said measuring waveguide sections provide conductively bounded wave propagating paths, and wherein said measuring waveguide section has cross-sectional dimensions substantially larger than the corresponding dimensions of the first waveguide section.

3. The apparatus claimed in claim 2 wherein,
the cross-sectional dimensions of said measuring waveguide section are at least three times greater than the corresponding dimensions of the first waveguide section.

4. The apparatus claimed in claim 2 and further including
receiver means coupled to said sampling means for providing signals corresponding to field strengths sampled by said sampling means.

5. The apparatus claimed in claim 4 and further including
means for preventing the generation of a signal corresponding to the field strength of waves at said fundamental frequency.

6. Apparatus claimed in claim 5 including,
means responsive to said receiver signals for providing an indication of average powers corresponding to the field strengths sampled by said sampling means.

7. Apparatus in accordance with claim 1 in which said coupling means is a tapered waveguide section.

8. Apparatus in accordance with claim 1 in which said sampling means comprises a probe mounted for transverse movement in the measuring waveguide section and adjustable for sampling the field strengths at a plurality of levels therein.

9. Apparatus in accordance with claim 2 in which said sampling means comprises a plurality of probes fixedly spaced on the conductive boundary of the measuring waveguide section transversely of the section and in coupling relationship with electromagnetic waves therein.

10. Apparatus in accordance with claim 4 in which said sampling means comprises a plurality of fixed probes spaced along the conductive boundary of the measuring waveguide section, and means for connecting said fixed probes successively to said receiver means.

11. Apparatus in accordance with claim 7 comprising a line stretcher between said first waveguide and said tapered waveguide section for varying the relative phases of the waves in the higher modes coupled to said measuring waveguide section.

References Cited
UNITED STATES PATENTS 3,230,481   1/1966   Lewis ____________ 333—21 X

OTHER REFERENCES

"A Sampling Measurement of Multimode Waveguide Power," by Sharp and Jones, IRE Transactions on Microwave Theory and Techniques, vol. MTT–10, January 1962, pp. 73–83.

Forrer, Max P., and Tomiyasu, Kiyo, "Determination of Higher Order Propagating Modes in Wave-Guide Systems," in Journal of Applied Physics, vol. 29, No. 7, July, 1958, p. 1040.

"Measurement of Harmonic Power Generation by Microwave Transmitters," by Price, IRE Transactions on Microwave Theory and Techniques, vol. MTT–7, January 1959, pp. 116–120.

WALTER L. CARLSON, *Primary Examiner.*

RUDOLPH V. ROLINEC, *Examiner.*

G. L. LETT, J. J. MULROONEY,
*Assistant Examiners.*